March 15, 1932.                R. BERTHON                 1,849,473
                SELECTOR FILTER FOR COLOR PHOTOGRAPHY
                        Filed June 27, 1929
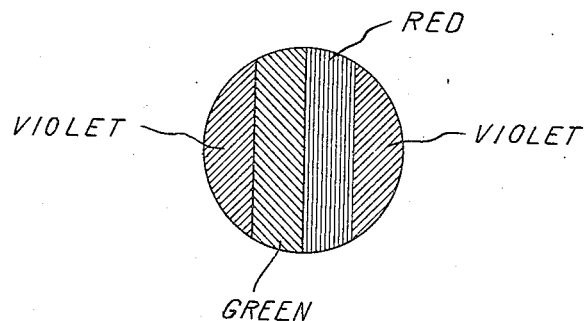
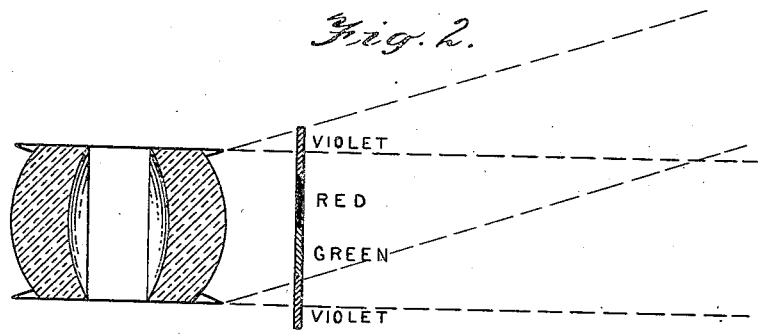
INVENTOR.
Rodolphe Berthon
BY
Gifford, Scull & Burgess
ATTORNEYS.

Patented Mar. 15, 1932

1,849,473

UNITED STATES PATENT OFFICE

RODOLPHE BERTHON, OF NEUILLY, FRANCE, ASSIGNOR, BY MESNE ASSIGNMENTS, TO KISLYN CORPORATION, OF NEW YORK, N. Y., A CORPORATION OF DELAWARE

SELECTOR FILTER FOR COLOR PHOTOGRAPHY

Application filed June 27, 1929, Serial No. 374,299, and in France July 6, 1928.

In the well known Berthon process of color photography on goffered film, use is made of color filters arranged in front of either the camera or the projection machine lens.

In the accompanying drawings in which I have shown a selected embodiment of the invention, Fig. 1 is a face view of a filter-selector constructed according to my invention.

Fig. 2 is a diagrammatic view showing the use of the filter-selector shown in Fig. 1.

Such color filters as were used up to the present comprise either three or four color stripes or bands.

Where 3-stripe or band filters are used, the stripes have different colors which, generally, are red, green and violet.

In the case of 5-stripe or band filter-selectors, the lateral bands are intended to remove such dominants as appear by the time of the projection process. Therefore, a certain relation must exist between the colors of these side bands and those of the remaining ones in the filter-selector.

The present invention has for its object a filter-selector for use in color photography on goffered film which is characterized primarily in that the said filter-selector comprises four bands; however, the side bands are both of the same color, whereby this selector is mainly distinguished from such as were used up to the present.

Taking as an example a trichromatic red-green-violet filter-selector, such as shown in Fig. 1, there may be provided two violet side bands, the two central bands being red and green respectively. The various bands in both Figs. 1 and 2 are for red, green and violet, and in the figures shading is used designating those colors.

In Fig. 2, L designates an objective of any suitable from in front of which is disposed the 4-banded filter-selector F. The lines A—X and B—X' represent a bundle of light rays coming from infinity and striking the objective after passing through the filter. Another bundle of rays is represented by the lines A—Y and B—Y', and it will be seen that these rays may easily miss one of the bands of the filter through which they pass. Nevertheless the proper effect is provided by the use of the extra band, in this case a violet band, as shown in Fig. 1.

It is to be understood that modifications may be made in the distribution of the colors. Thus, for instance, the side bands might display a red color while the two central bands would be colored green and violet respectively.

This invention is subject to no limitation whatever as far as the width of the bands is concerned. Each band in the filter may be given a different width without departing from the scope of the invention.

For picture taking and most picture-projecting purposes, the filter-selector consists of a dyed carrier made of such material as gelatine, celluloid and the like.

I claim as my invention:

1. A filter-selector for use in connection with color photography on goffered film, characterized primarily in that the filter-selector, comprises four bands amongst which the outer ones are of the same color while the two central bands each display a different color so as to provide a trichromatic filter-selector.

2. A filter-selector for use in connection with color photography on goffered film, having a plurality of bands disposed parallel to each other, with the two outer bands of the same color and the intermediate bands of different colors, the sum of the colors of said intermediate bands and one of said outer bands giving substantially the sensation of white light.

In testimony whereof, I affix my signature.

RODOLPHE BERTHON.